(12) United States Patent
Yamashita et al.

(10) Patent No.: US 6,721,245 B1
(45) Date of Patent: Apr. 13, 2004

(54) OPTICAL RECORDING MEDIUM PROCESSING APPARATUS AND SEEK CONTROL METHOD THEREFOR

(75) Inventors: Tomonori Yamashita, Kato-gun (JP); Toru Ikeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/448,541

(22) Filed: Nov. 23, 1999

(30) Foreign Application Priority Data

Mar. 30, 1999 (JP) .......................................... 11-089979

(51) Int. Cl.$^7$ ................................................. G11B 7/00
(52) U.S. Cl. ................................. 369/44.28; 369/44.34
(58) Field of Search ......................... 369/44.27, 44.28, 369/44.29, 44.34, 44.35, 44.32

(56) References Cited

U.S. PATENT DOCUMENTS

| | | | | |
|---|---|---|---|---|
| 5,289,447 A | * | 2/1994 | Kobayashi et al. | 369/44.27 |
| 5,416,758 A | * | 5/1995 | Ito | 369/44.28 |
| 5,646,915 A | * | 7/1997 | Ogino | 369/44.27 |
| 5,650,984 A | | 7/1997 | Yamaguchi et al. | 369/32 |
| 5,675,560 A | * | 10/1997 | Ogino | 369/44.27 |
| 5,737,284 A | * | 4/1998 | Yamada | 369/32 |
| 5,933,397 A | * | 8/1999 | Yamashita et al. | 369/44.27 |
| 6,157,599 A | * | 12/2000 | Yamashita et al. | 369/44.27 |

FOREIGN PATENT DOCUMENTS

| | | |
|---|---|---|
| EP | 478 312 | 4/1992 |
| EP | 478 314 | 4/1992 |
| JP | 4351720 | 12/1992 |
| JP | 863912 | 3/1996 |
| JP | 8339547 | 12/1996 |
| JP | 10-91976 | 4/1998 |

* cited by examiner

*Primary Examiner*—Nabil Hindi
(74) *Attorney, Agent, or Firm*—Greer, Burns & Crain, Ltd.

(57) ABSTRACT

There is provided an optical recording medium processing apparatus comprising: a carriage including a lens to guide a light beam to a recording medium for moving in a direction extending across tracks on the recording medium; a detector for detecting a TES; and a controller for moving the carriage across the tracks from an innermost circumferential position of the medium or its vicinity, for counting the number of tracks in accordance with a TZC pulse generated by the TES having a predetermined level or higher detected by the detector, and after the carriage has been moved for a predetermined period of time, for positioning the light beam spot on a target track in accordance with the counted number of the tracks. Therefore, the initial seek control process, whereby the carriage is moved from the innermost circumferential position of the medium or its vicinity to the center, can be performed without a position sensor.

17 Claims, 8 Drawing Sheets

OPTICAL RECORDING MEDIUM PROCESSING APPARATUS AND SEEK CONTROL METHOD THEREFOR

BACKGROUND OF THE INVENTION

1. Field of the Invention

The present invention relates to an optical recording medium processing apparatus for optically recording information to and/or reproducing information from an optical recording medium, such as a magneto-optical disk, and in particular to an optical recording medium processing apparatus performing a seek control process without a sensor for detecting the position of a carriage for moving a light beam spot in direction extending across the tracks of the recording medium.

2. Related Arts

One of the presently available optical recording mediums is the magneto-optical disk. Such a disk is composed of a substrate and of a magnetic recording layer which is deposited on the substrate. To record information on a magneto-optical disk, optical heating and magnetic field changes are employed. To reproduce information which has been recorded on a magneto-optical disk, magneto-optical technology is employed. On a magneto-optical disk there are data tracks for recording data and control tracks for recording medium information unique to the magneto-optical disk, and included in each track is an identification (ID) portion for identifying a sector as a recording area, and a data portion for recording data. In order to prevent the overwriting of data, the control track is provided by using a stamper to form embossed bits in the substrate. The embossed bits in the substrate can also be formed by injection molding. For the same reason, embossed bits also formed in the substrate in the identification portion using the same manufacturing process.

Currently available magneto-optical disks have several different memory capacities, 128 MB, 230 MB, 540 MB, 640 MB and 1.3 GB. The PPM (Pit Position Modulation) recording method for recording data in accordance with whether a mark is present on the disk is employed for a magneto-optical disk of 128 MB. Constant angular velocity (CAV) is employed as the recording formatting for a magneto-optical disk of 128 MB, and zone constant angular velocity (ZCAV) is employed for a magneto-optical disk of 230 MB. In a user area on a magneto-optical disk of 128 MB there is one zone, whereas in a user area on a magneto-optical disk of 230 MB there are ten.

The PWM (Pulse Width Modulation) recording method for recording data while correlating with the edges of a mark, i.e., the front edge and the rear edge, is employed for the high-density recording of MO cartridge media having capacities of 540 MB and 640 MB. This difference in the memory capacities of the 540 MB and the 640 MB magneto-optical disks is due to a difference in sector capacities. When a sector capacity of 2048 bytes is employed, an optical disk of 640 MB is produced, but when a sector capacity of 512 bytes is employed, an optical disk of 540 MB is produced. The recording format used for both optical disks is zone CAV, but in a user area on an optical disk of 640 MB there are 11 zones, while in a user area on an optical disk of 540 MB there are 18 zone.

As is described above, since the data recording methods, the recording formats and the sector capacities differ depending on the capacities of the several types of magneto-optical disks, to cope with these disks which have such different specifications, an optical recording medium processing apparatus for storing data on, or for reproducing data stored on a magneto-optical disk must also be capable of identifying the recording media type at the time a magneto-optical disk is loaded.

Conventionally, the ID portion of a track is read from a location near the center, between an inner circumferential position and an outer circumferential position, of a magneto-optical disk which has been loaded, and bit interval is employed to identify the magneto-optical disk type. For the identification of the magneto-optical disk type, the bit interval in the ID portion at the location near the center is employed because if the bit interval in an ID portion near the inner circumferential position or the outer circumferential position were used, an erroneous identification would be obtained.

In order to read the ID portion of a track near the center of a magneto-optical disk, when a magneto-optical disk is loaded the optical recording medium processing apparatus performs an initial process, i.e., an initial seek control process, for moving a carriage including a lens to guide a light beam to the face of the magneto-optical disk in the direction extending across the tracks, and for positioning the light beam at a track near the center of the recording medium.

Since when a magneto-optical disk is loaded or when the power is turned on the position of the carriage is unknown, the optical recording medium processing apparatus need to recognize the position of the carriage in the direction extending across the tracks. Thus, when a magneto-optical disk is loaded, a predetermined current is supplied to a coil for driving the carriage, and the carriage is first impelled inward until it arrives at the innermost circumferential position. Even if the carriage is located at the outermost circumferential position when a magneto-optical disk is loaded, a predetermined current, which is adequate as far as strength or time is concerned, is supplied to impel the carriage until it arrives at the innermost circumferential position.

Included in a conventional optical recording medium processing apparatus is a position sensor which is turned on when the carriage is situated at the innermost circumferential position, and is turned off when the carriage moves a predetermined distance from the innermost circumferential position to the direction extending across the tracks. That is, the optical recording medium processing apparatus recognizes that the carriage is located at the innermost circumferential position by the turning-on of the position sensor, the apparatus can then control moving the carriage based on the recognition. Subsequently, when the carriage is moved and the light beam spot is positioned on near the center of the recording medium, the light beam can be focused and various other adjustments can be made.

However, since the position sensor is included in the optical recording medium processing apparatus, manufacturing costs are increased.

SUMMARY OF THE INVENTION

It is, therefore, one objective of the present invention to provide an optical recording processing apparatus performing an initial seek control process for a carriage without the position sensor.

To achieve the above objective, according to the present invention, there is provided an optical recording medium processing apparatus for accessing the recording medium by irradiating a light beam to a recording medium comprising:

a carriage including a lens to guide the light beam to the recording medium for moving in a direction extending across tracks on the recording medium;

a detector for detecting a tracking error signal indicating a difference between a predetermined track and a light beam spot on the recording medium; and a controller for moving the carriage across the tracks from an innermost circumferential position of the recording medium or the vicinity of the position, for counting the number of tracks in accordance with a track zero-cross pulse generated by a tracking error signal having a predetermined level or higher detected by the detector, and after the carriage has been moved for a predetermined period of time, for positioning the light beam spot on a target track in accordance with the counted number of the tracks.

As a result, when a recording medium is loaded, or when power is turned on, the initial seek control process, whereby the carriage is moved from the innermost circumferential position of the recording medium or its vicinity to the center, can be performed without a position sensor being required.

The detector detects the tracking error signal from a track area including tracks standardized by a predetermined standard on the recording medium, after the carriage has been moved for the predetermined period of time. Therefore, the light beam spot can be positioned on a target track that is designated in advance, by counting the number of tracks encountered before the target track is reached.

The controller accelerates the carriage for a predetermined period of time, and then moves the carriage at a predetermined constant speed. During the constant speed control, the amplitude level for a tracking error signal and an offset are adjusted. Therefore, at the same time as the light beam spot is positioned near the center of the recording medium, track-on control can be started.

DETAILED DESCRIPTION OF THE PREFERRED EMBODIMENT

The preferred embodiment of the present invention will now be described. It should be noted, however, that the technical scope of the present invention is not limited to this embodiment.

Figure 1:
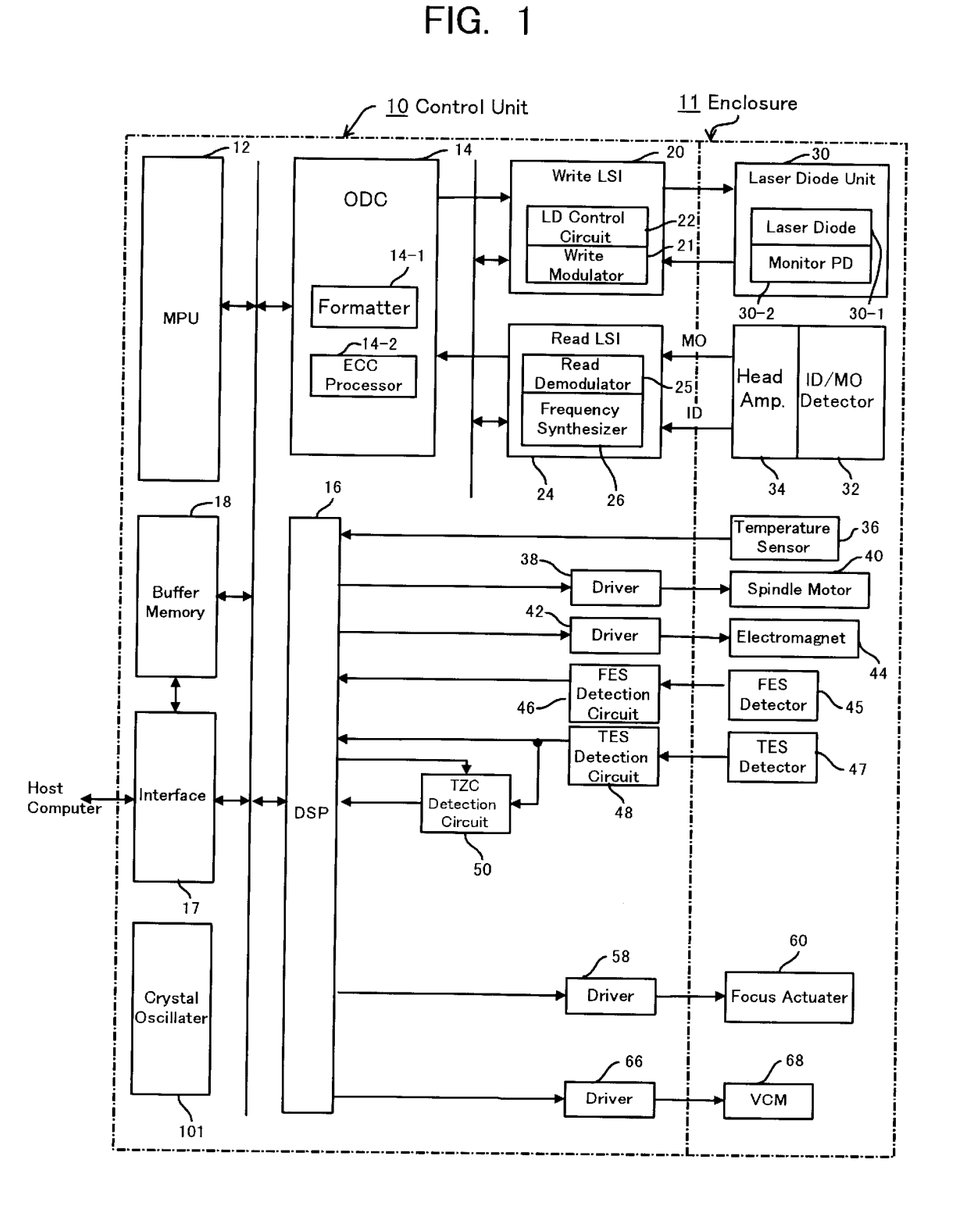
FIG. 1 is a block diagram illustrating the arrangement of an optical recording medium processing apparatus according to one embodiment of the present invention.

FIG. 1 is a block diagram showing the overall arrangement of an optical recording medium processing apparatus according to one embodiment of the present invention. As is shown in FIG. 1, the optical recording medium processing apparatus comprises a control unit 10 and an enclosure 11. The control unit 10 includes an MPU 12, for providing the overall control for the optical recording medium processing apparatus; an interface 17, for exchanging commands and data with a host computer (not shown); an optical disk controller (ODC) 14, for performing a required process for reading/writing commands and data relative to a magneto-optical disk (not shown); a digital signal processor (DSP) 16; and a buffer memory 18. The buffer memory 18 is employed in common by the MPU 12, the ODC 14 and the interface 17, and includes, for example, a dynamic random access memory (DRAM). A crystal oscillator 101 for generating a clock is connected to the MPU 12.

A formatter 14-1 and an error correction code (ECC) processor 14-2 are provided for the ODC 14. For write access, the formatter 14-1 divides NRZ write data into the sectors for an optical disk, and generates a recording format. The ECC processor 14-2 generates an ECC for each sector write data set, and adds it thereto, and also generates cyclic redundancy check (CRC) code and adds it to the data. Further, the ECC processor 14-2 converts the ECC coded sector data into, for example, 1–7 run length limited (RLL) code.

For read access, a 1–7 RLL reverse conversion is performed for sector data, and a CRC is performed for the resultant sector data by the ECC processor 14-2. Then, error detection and correction are performed by using an ECC. Thereafter, NRZ data for individual sectors is linked together by the formatter 14-1, and the resultant data are transmitted as a stream of NRZ read data to the host computer.

A large-scale integrated write circuit (LSI) 20 is provided for the ODC 14, and includes a write modulator 21 and a laser diode (LD) control circuit 22. The output of the LD control circuit 22 is transmitted to a laser diode unit 30, which is provided for an optical unit in the enclosure 11. The laser diode unit 30 integrally includes a laser diode 30-1 and a monitor detector 30-2. In accordance with the type of magneto-optical disk, the write modulator 21 converts the write data into a data form for pit position modulation (PPM) recording (also called mark recording) or for pulse width modulation (PWM) recording (also called edge recording).

A read LSI circuit 24 is provided as the reading system for the ODC 14, and incorporates a read demodulator 25 and a frequency synthesizer 26. A light received signal for a laser beam, which is returned by the laser diode 30-1 and which is detected by the ID/MO detector 32 in the enclosure 11, is transmitted to the read LSI circuit 24, via a head amplifier 34, as an ID signal and an MO signal.

The read demodulator 25 of the read LSI circuit 24 includes function circuits, such as an automatic gain control (AGC) circuit, a filter and a sector mark detection circuit. The read demodulator 25 generates a read clock and read data using the received ID signal and MO signal, and demodulates the PPM data or PWM data to obtain the original NRZ data. Since the zone CAV is employed, a frequency division ratio is set so that the MPU 12 permits a frequency synthesizer 26 in the read LSI circuit 24 to generate a clock frequency which corresponds to a zone.

The frequency synthesizer 26 is a phase locked loop (PLL) circuit having a programmable frequency divider, and generates, as a read clock, a reference clock having a unique frequency which is determined in advance in accordance with the zone position of an optical disk. That is, the frequency synthesizer 26 is constituted by a PLL circuit having a programmable frequency divider, and generates, by using fo=(m/n)·fi, a reference clock for a frequency obtained at the frequency division ratio of m/n, which the MPU 12 sets in accordance with the zone number.

The frequency division value n, which is the denominator for the frequency division ratio m/n, is a unique value corresponding to the optical disk type, such as 128 MB, 230 MB, 540 MB, 640 MB or 1.3 GB. The frequency division value m, which is the numerator for the frequency division ratio m/n, changes in accordance with the zone position of the optical disk, and is prepared in advance as table information for values which correspond to zone numbers for individual optical disks. Further, fi indicates the frequency of a reference clock generated outside the frequency synthesizer 26.

The read data demodulated by the read LSI circuit 24 are transmitted to the reading system of the ODC 14, and a 1–7 RLL reverse conversion is performed for the read data. Then, the CRC and ECC processing is performed for the resultant read data by the ECC processor 14-2, and the obtained data are converted into a stream of NRZ read data which is linked to NRZ sector data. The NRZ read data stream is transmitted through the interface 17, via the buffer memory 18, to the host computer.

The MPU 12 receives a detection signal via the DSP 16 from a temperature sensor 36 provided in the enclosure 11. In accordance with the ambient temperature of the optical disk, which is detected by the temperature sensor 36, the MPU 12 adjusts the read, write and erase light emission power of the laser diode control circuit 22 to the optimal values.

The MPU 12 controls a spindle motor 40 in the enclosure via the DSP 16 and a driver 38. In this embodiment, since the recording format for the optical disk is the zone CAV, the spindle motor 40 is rotated at a constant speed of, for example, 3000 rpm.

Also, the MPU 12 controls an electromagnet 44 in the enclosure 11 via the DSP 16 and a driver 42. The electromagnet 44 is located opposite the beam irradiated side of an optical disk which is loaded into the optical recording medium processing apparatus, and supplies an external magnetic field to the optical disk during the recording and erasing processing.

The DSP 16 includes a servo function for positioning the beam from the laser diode 30 on the optical disk, and serves as a seek controller which seeks a target track and an on-track controller which maintains an on-track position. The seek controller and the on-track controller can be activated at the same time in parallel with the write access or read access process in response to an upper level command issued by the MPU 12.

In order to perform the servo function of the DSP 16, a focus error signal (FES) detector 45 is provided for the optical unit in the enclosure 11 to receive a beam returning from the optical disk. An FES detection circuit 46 generates an FES using the output of the FES detector 45, and transmits it to the DSP 16. The DSP 16 activates a driver 58 to control a focus actuator 60, thereby performing the focus-on control process.

A tracking error signal (TES) detector 47 is also provided for the optical unit in the enclosure 11 to receive a beam returning from the optical disk. A TES detection circuit 48 generates a TES using the output of the TES detector 47, and transmits it to the DSP 16. The TES is also transmitted to a track zero-cross (TZC) detection circuit 50, which then generates a TZC pulse and transmits it to the DSP 16. The DSP 16 activates a driver 66 to control a voice coil motor (VCM) 68, thereby performing the seek control and the track-on control processes.

Figure 2:
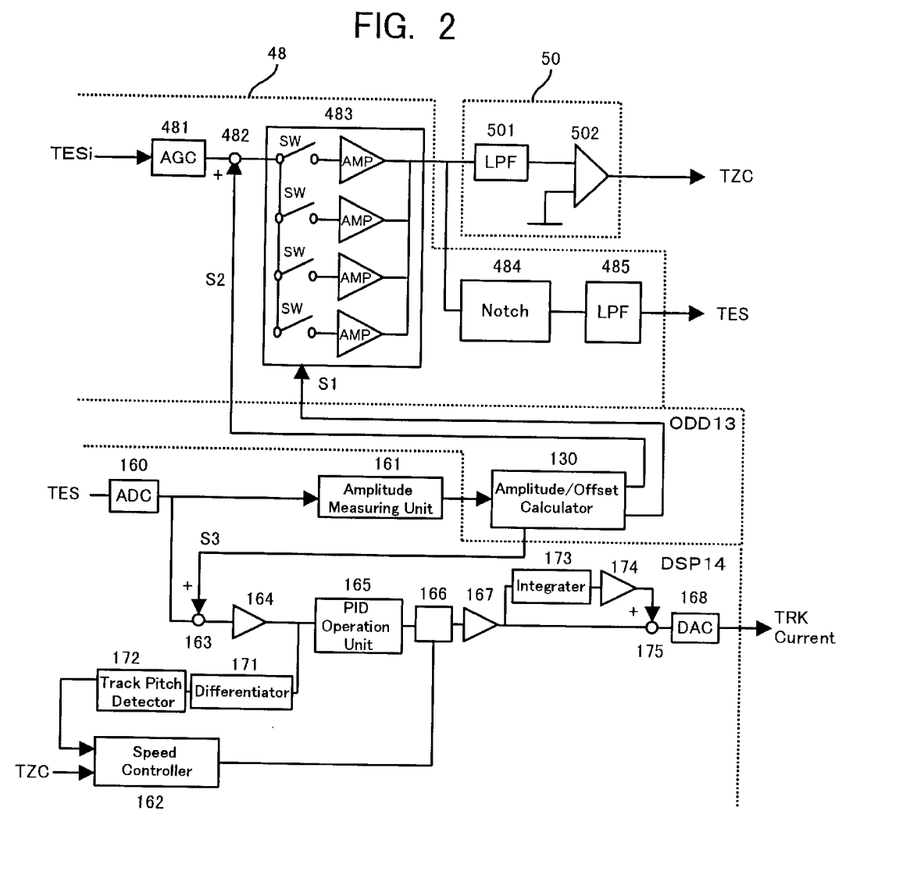
FIG. 2 is a block diagram showing the functions of a TES detector, a TZC detector and a DSP for performing seek control and tracking control processes.

FIG. 2 is a functional block diagram illustrating the TES detection circuit 48, the TZC detection circuit 50 and the DSP 16 for the seek control and the tracking control processes. In FIG. 2, a TESi from the TES detector 47, for adjusting signal sensitivity, is transmitted via an automatic gain control circuit 481 and a node 482 in the TES detection circuit 48 to a gain adjustment circuit 483. As will be described later, a correction signal from an amplitude/offset calculator 130 in an optical disk driver (ODD: not shown in FIG. 1) 13 for reducing an offset variance is transmitted to the node 482. The ODD 13 is firmware for controlling physical circuits, such as the TES detection circuit 48 and the TZC detection circuit 50, under the control of the ODC 14.

The gain adjustment circuit 483 in this embodiment includes four amplifiers (AMP) disposed in parallel to each other and switches (SW) for rendering these amplifiers on and off. Since, as will be described later, the conductive states of the four amplifiers are so controlled that the amplitude of the TES received by the DSP 16 does not exceed the range of an AC converter (ADC) 160 in the DSP 16, the TES gain is controlled.

The TESi output by the gain adjustment circuit 483 is transmitted via a notch circuit 484 and a low-pass filter (LPF) 485. The LPF 485 outputs a TES from which noise is removed and for which the waveform shape is adjusted. The TESi output by the gain adjustment circuit 483 is also transmitted to the TZC detection circuit 50. In the TZC detection circuit 50, a comparator compares the TESi which has been passed through a low-pass filter (LPF) 501 with a predetermined slice level, and outputs a track zero-cross (TZC) pulse.

The TES output by the TES detection circuit 48 is converted into a digital signal by the ADC 160 of the DSP 16. The digital signal is transmitted to an amplitude measuring unit 161 and a node 163, and the TZC pulse from the TZC detection circuit 50 is transmitted to a speed controller 162.

The TES received by the amplitude measuring unit 161 is used to adjust the amplitude of the TES and to control the offset, which will be described later, and the TES received by the node 163 is used for on-track control. Instead of the TES from the TES detection circuit 48, the TESi output by the gain adjustment circuit 483 may be transmitted directly to the amplitude measuring unit 161.

The TZC pulse received by the speed controller 162 is used for the performance of the initial seek control in the embodiment, which will be described later. The functions of the other components of the DSP 16 in FIG. 2 will be described later, together with the individual control processes which will also be described then.

Figure 3:
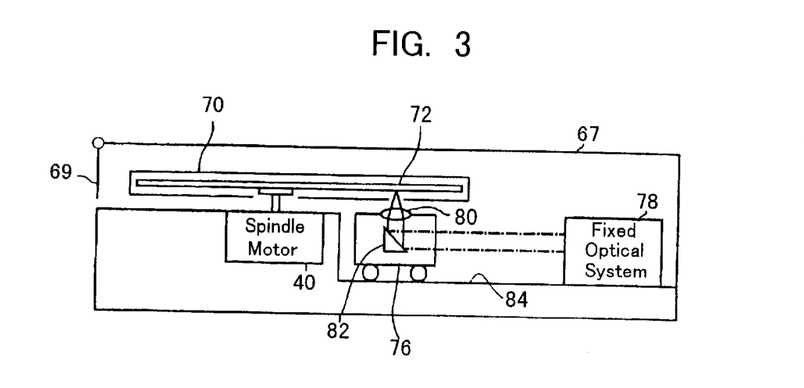
FIG. 3 is a schematic cross-sectional view of the arrangement of an enclosure.

FIG. 3 is a schematic cross-sectional view of the enclosure 11. As is shown in FIG. 3, the spindle motor 40 is provided in a housing 67. When the spindle motor 40 is inserted into a cartridge 70 fed in via an inlet door 69, a magneto-optical disk 72 in the cartridge 70 is attached to the hub of the rotary shaft of the spindle motor 40 and is loaded into the optical recording medium processing apparatus.

A carriage 76 is located under the loaded magneto-optical disk 72 and can freely move across the tracks of the magneto-optical disk 72 along a guide rail 84. An object lens 80 is mounted on the carriage 76, and a beam from the laser diode 30-1 located in a fixed optical system 78 is guided via a refractive mirror 82 and is focused on a spot on the recording face of the magneto-optical disk 72. The object lens 80 itself is moved in the light axial direction by the focus actuator 60 included in the enclosure in FIG. 1.

Figure 4:
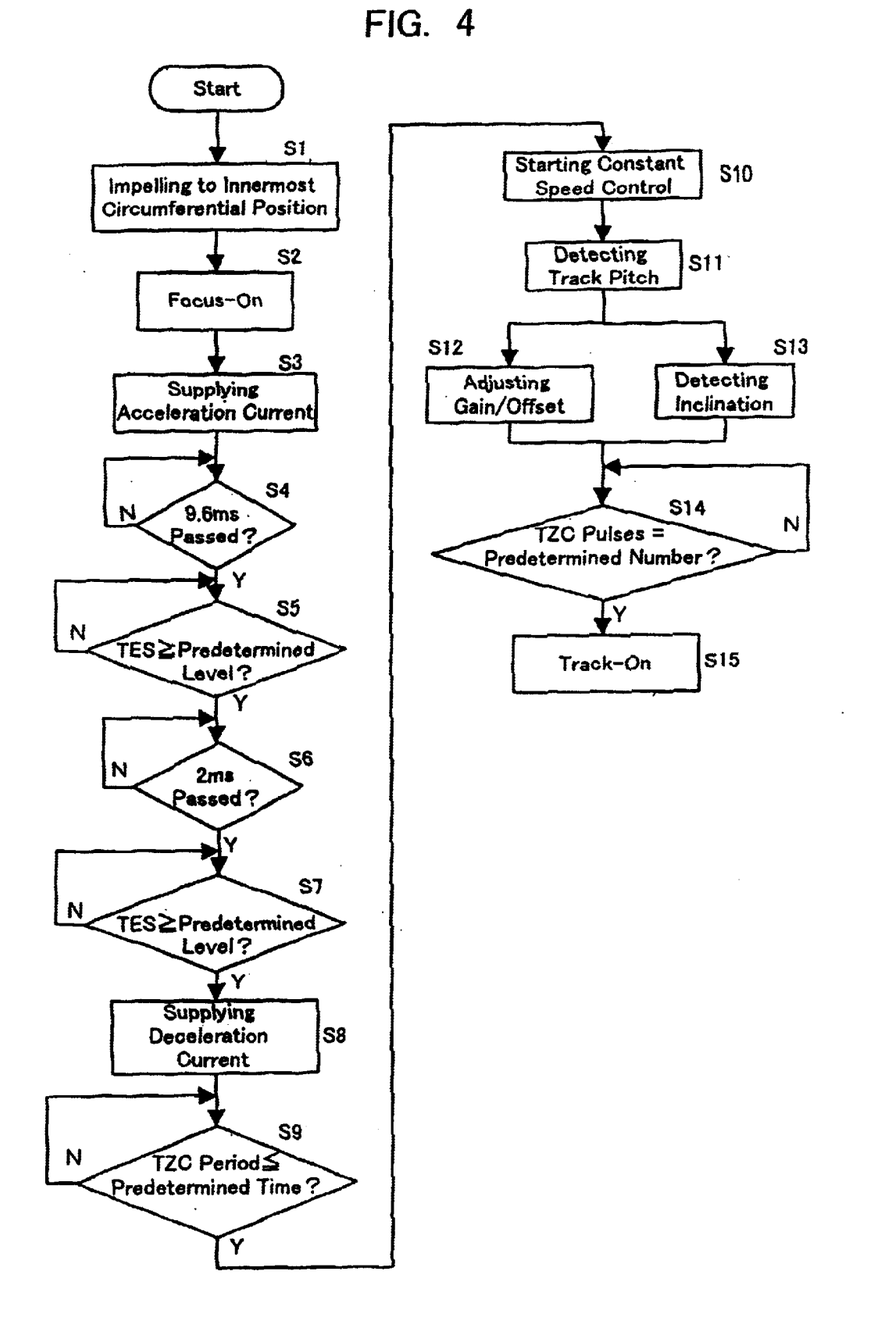
FIG. 4 is a flowchart showing the initial seek control processing performed according to the embodiment of the present invention.
Figure 5:
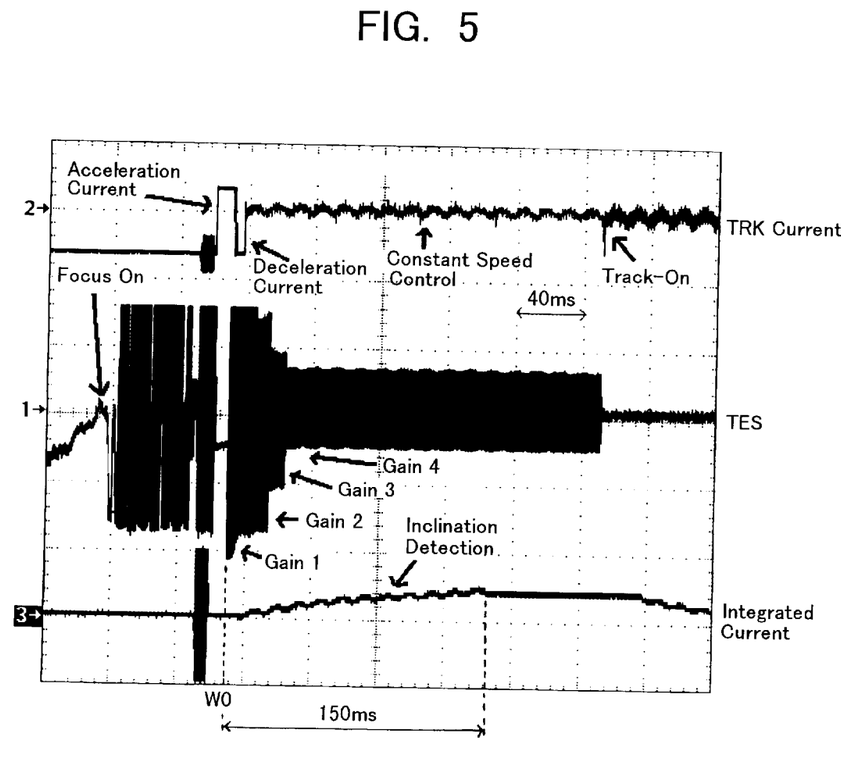
FIG. 5 is a timing chart showing the initial seek control processing performed according to the embodiment of the present invention.
Figure 6:
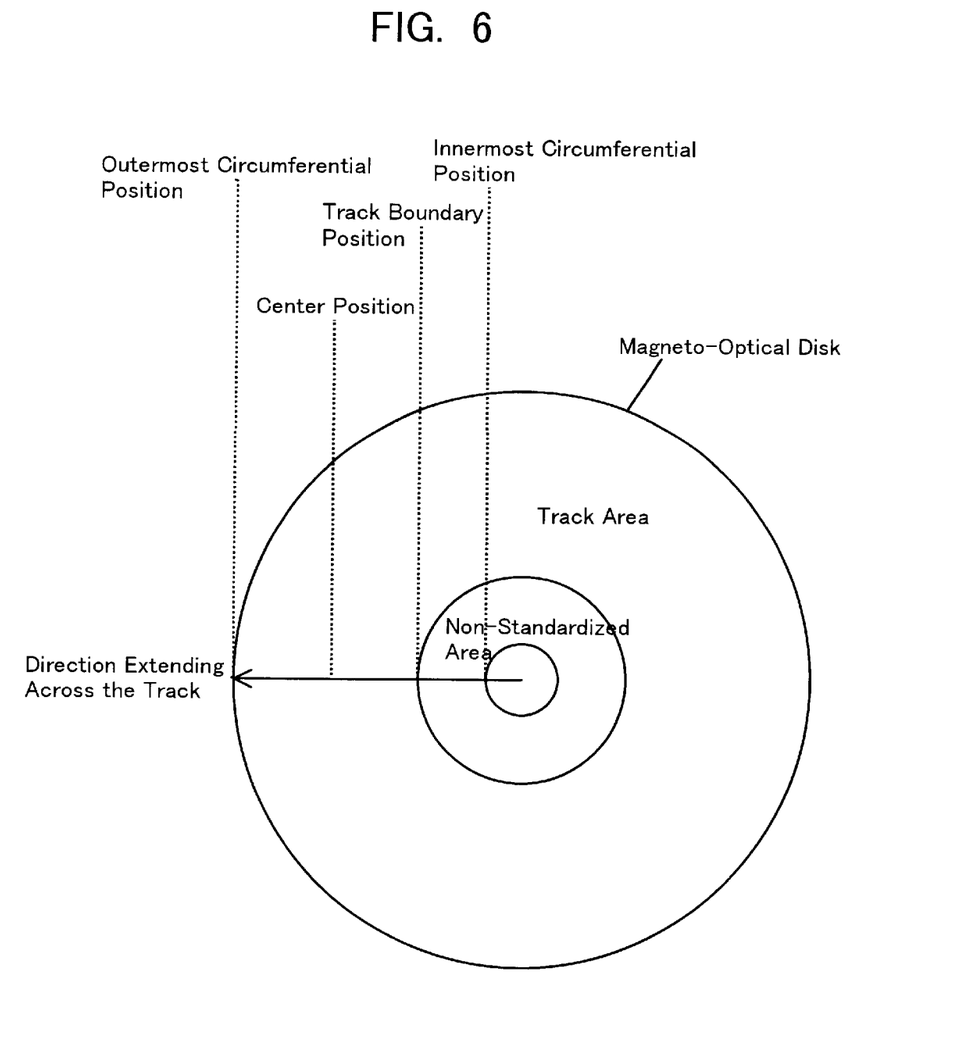
FIG. 6 is a diagram for explaining areas and positions on a recording medium.

The initial seek control processing performed in accordance with this embodiment will now be described. FIG. 4 is a flowchart showing the initial seek control process for the embodiment of the present invention; FIG. 5 is a timing chart for this processing; and FIG. 6 is a diagram for explaining areas and positions on a recording medium. The initial seek control processing for this embodiment will now be described while referring to FIGS. 2, 4, 5 and 6. This processing is performed by the speed controller 162 in the DSP 16 shown in FIG. 2.

In FIG. 4, first, at step S1, for a predetermined period of time a current of approximately 500 mA is supplied to a VCM 68 which drives the carriage 76, which is then impelled inward, at an acceleration of 52.5 m/s$^2$, until it has reached the innermost circumferential position (see FIG. 6). The supply of this acceleration current continues for a period of time which will suffice to move the carriage to the innermost circumferential position, even from the outermost circumferential position (see FIG. 6). The acceleration current is output by the speed controller 162 in FIG. 2, and is transmitted via the switch 166 and the gain control circuit 167 to a DA converter (DAC) 168. The DAC 168 converts the current into an analog signal, and transmits it to the VCM 68. The switch 166 selects the output from the speed controller 162 in the initial seek processing, and selects the output from a PID operation unit 165 during the on-track control processing.

When the supply of the current which impels the carriage 76 toward the innermost circumferential position has ceased, at step S2, a focus servo is driven in a state wherein the maximum gain for the gain adjustment circuit 483 is set initially. That is, at the innermost circumferential position, the FES detection circuit 46 employs light received by the FES detector 45 to generate an FES, and the DSP 16 permits the focus actuator 60 to focus the object lens 80 mounted on the carriage 76 in the light axial direction. When a FES is not detected at the innermost circumferential position, the carriage 76 is shifted slightly from that position, and the focus servo is again driven. It should be noted that the maximum gain for the gain adjustment circuit 483 is initially set because detection of a TES at an unestablished level is ensured.

As is shown in FIG. 6, the area from the innermost circumferential position of the magneto-optical disk to the track boundary position, where tracks standardized by the ISO standards begin, is a non-standardized area for which no specification is defined by the ISO standards. Therefore, there are no track indentations on the face of the medium, and in many cases no TES is detected. Sometimes, the serial number of the magneto-optical disk is imprinted in this area, and in this case, the TES is detected by focusing, as is shown in FIG. 5. The innermost circumferential position of the magneto-optical disk is the innermost circumferential position in the movable range of the carriage 76.

At step S2 the focusing is performed, and at step S3 the speed controller 162 supplies to the VCM 68 an acceleration current as a track current (TRK current) to accelerate the carriage from the innermost circumferential position to the outer circumferential position. The current value is, for example, 500 mA, and corresponds to an acceleration of 52.5 m/s$^2$. The current supply time is the time required for the light beam spot to pass the track boundary position and enter the track area. This time is set in advance to 9.6 ms, for example.

When at step S4 the time of 9.6 ms has passed, at step S5, a check is performed to determine whether the TES has been detected. Specifically, a signal from the TES detection circuit 48 is transmitted to the DSP 16. The ADC 160 of the DSP 16 samples a received signal at a predetermined time interval. When the output level of the ADC 160 is equal to or higher than 25% of the range of the ADC 160, the amplitude measuring unit 161 determines that the TES has been detected. The determination as to whether the TES has been detected is performed after the time of 9.6 ms has passed because, as is described above, the TES detection circuit 48 would detect a signal at a predetermined level or higher due to indentations which exist in an area for which no specifications are defined by the ISO standards, and the amplitude measuring unit 161 would erroneously ascertain that the TES had been is detected.

Preferably, when an additional 2 ms have passed (step S6), a determination as to whether the TES has been detected is again made (step S7). This process is performed because if the TES detected at step S5 was a temporary noise signal, the possibility is avoided that an erroneous determination will be made that the light beam spot has entered the track area. When a signal at a predetermined level or higher is detected at steps S5 and S7, it is ascertained that the light beam has entered the track area.

When, at step S7, the TES is detected, at step S8 the speed controller 162 supplies to the VCM 68 a deceleration current as the TRK current used to reduce the speed of the carriage 76. The value of the supplied current is, for example, −500 mA and corresponds to a deceleration of −52.5 m/s$^2$. The supply of this deceleration current is continued until the period for a TZC pulse generated by the track zero-cross (TZC) detection circuit 50 has reached a predetermined time (e.g., 64.7 μs) or shorter. The speed of the carriage 76 can be calculated by using the period for the TZC pulse and the track pitch, which is the width of one track. When, for example, the track pitch is 1.10 μm and the period for the TZC pulse is 64.7 μs, the speed of the carriage 76 corresponds to approximately 17 mm/s.

When, at step S9, a period for the TZC pulse is reached which is equal to or shorter than a predetermined time, the supply of a deceleration current is stopped, and the carriage 76 is moved at a constant speed. The target speed of the carriage 76 is set, for example, to 15 mm/s.

As is described above, the speed of the carriage 76 can be obtained by using the period for the TZC pulse and the track pitch; however, sometimes the track pitch differs depending on the type of the magneto-optical disk. Therefore, the track pitch must be detected in order to maintain the target speed of the carriage 76. In this embodiment, when control of moving the carriage 76 at a constant speed (constant speed control) is started at step S10, at step S11 a track pitch is detected based on a ratio of the sensitivity of the land of the track obtained by the TES to the sensitivity of the groove, which will be described later. It should be noted that until the preceding detection of the track pitch has been detected the constant speed control is performed based on a track pitch which is set in advance (e.g., 1.10 μm). Further, in order to prevent the erroneous detection of a track pitch, it is preferable that, at step S11, preferably the detection of a track pitch is performed a plurality of times during the constant speed movement of the carriage 76. For example, after the constant speed control is started, the track pitch is detected each time a predetermined time has passed or each time a predetermined number of tracks has been crossed, and this detection is repeated until the same track pitch is detected sequentially a plurality of times (e.g., three times).

By detecting the track pitch, it is possible to obtain the number of tracks up to the center position (see FIG. 6), whereat the light beam spot is positioned by the initial seek control process. That is, since in the track area the portion extending in the radial direction across the tracks is defined by the ISO standards, the distance from the track boundary position, which is already known, to the center position, which is set in advance, is divided by the track pitch to obtain the number of tracks crossing the area extending from the track boundary position to the center position.

Since the track boundary position is substantially the same as the position whereat the TES is detected at step S5, TZC pulses, which are obtained using the TES detected at step S5, are counted, and the carriage 76 is controlled at the constant speed until a predetermined number of tracks have been counted. As a result, the light beam spot can be positioned in the center. It should be noted that in the initial seek control process only the pit interval of the ID portion near the center position in FIG. 6 need be detected, and that the light beam spot need not be accurately positioned on a track corresponding to the center position in FIG. 6. Therefore, the TES detected at step S5 may be a TES which corresponds to the track in the track area near the track boundary position, and the light beam spot may not be positioned on a track corresponding to the track boundary position.

Therefore, when the constant speed control is started at step S10, the speed controller 162 counts the TZC pulses, and at the same time adjusts a current, based on a detected track pitch, to be supplied to the VCM 68 in order to maintain the target speed of the carriage 76. The speed controller 162 may include the number of tracks up to the center position as data for each detected track pitch, or may obtain the number of tracks by calculation.

In this embodiment, during the constant speed control to the carriage 76, the gain and offset adjustment process for the TES (step S12) and the inclination detection process (step S13), which will be described later, are performed. The two processes are performed in parallel.

If, at step S14, the number of TZC pulses reaches a predetermined number of tracks, it is assumed that the light beam spot has nearly reached the center position of the recording medium, and at this position track-on control is selected (step S15). That is, the switch 265 is changed. During the track-on control, at the node 163 a correction signal from the amplitude/offset calculator 130 is added to the TES output by the ADC 160, and the amplitude and the offset of the TES are adjusted. The TES is output by the node 163, via the gain control circuit 164, to the PID operation unit 165. The PID operation unit adjusts the gain for the TES by proportional differential and integral calculations. The resultant TES is converted into an analog signal by the DAC (digital analog converter) 168, via the gain control circuit 167, and the analog signal is output as the TRK current.

When the ID portions of the tracks near the center position are read in the track-on control, the pit interval is identified by counting the number of tracks, and the magneto-optical disk type is specified. When the disk type has been specified, the output of a light source, which corresponds to the specified disk type, and the number of round of the magneto-optical disk are set.

As is described above, in this embodiment, the carriage 76 is moved by the acceleration current, from the innermost circumferential position or its vicinity to the track boundary position, i.e., the position whereat the TES is detected in the track area standardized by the ISO standards on the recording medium. Then, by counting the TZC pulse obtained from the TES, the number of tracks are counted. As a result, the initial seek control process is performed in which the light beam spot is positioned near the center position of the recording medium. Therefore, the initial seek control process can be performed without the conventional position sensor being required.

The track pitch detection process at step S10 will now be described. In this embodiment, a track pitch is detected based on the ratio of sensitivities of the land and the groove for one track. Specifically, there are three types of track pitches for magneto-optical disks: 1.10 μm, 1.39 μm and 1.60 μm. It is known that the sensitivity ratio of the land to the groove for each recording medium is (land:groove):

| | |
|---|---|
| recording medium of 1.10 μm | 1:0.66; |
| recording medium of 1.39 μm | 1:0.53; and |
| recording medium of 1.60 μm | 1:0.46. |

The sensitivities of the land and the groove can be obtained from a differential signal of the TES signal.

Figure 7:
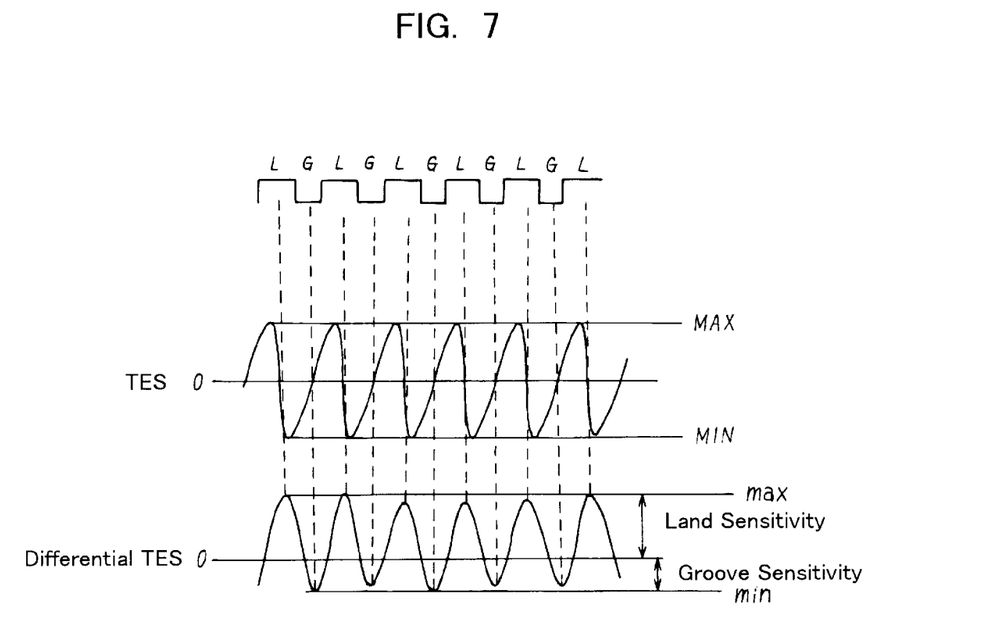
FIG. 7 is a diagram showing a relationship between a partial cross section of a magneto-optical disk and a corresponding TES and its differential signal.

FIG. 7 is a diagram showing a partial cross section of a magneto-optical disk and a relationship between a corresponding TES and its differential signal. As is shown in FIG. 7, when a differential signal for the TES (hereinafter referred to as a differential TES) is acquired, the "max" for the differential TES is obtained as the sensitivity of the land, and the "min" for the differential TES is obtained as the sensitivity of the groove.

Figure 8:
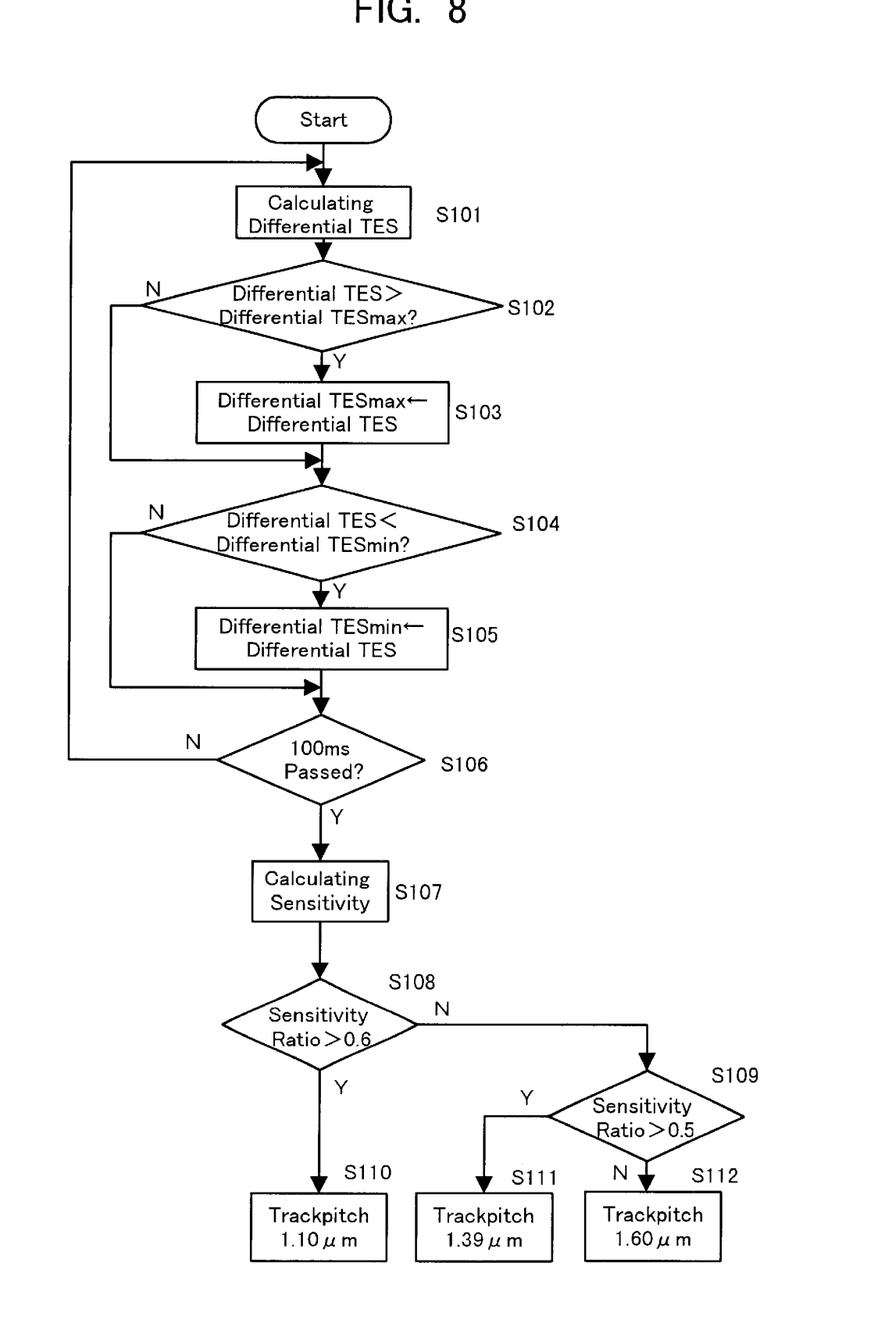
FIG. 8 is a flowchart showing the track pitch detection processing which is performed.

FIG. 8 is a flowchart showing the track pitch detection processing at step S10. At step S101, at each predetermined sampling time a differentiator 171 in FIG. 2 calculates a differential signal (differential TES) for the TES which is input to the DSP 16. The differential TES is then transmitted to a track pitch detector 172. At step S102, the track pitch detector 172 compares the obtained differential TES value with the maximum level (differential $TES_{max}$) up to the preceding sampling. When at step S103 the differential TES value is greater than the differential $TES_{max}$, the track pitch detector 172 stores the differential TES value as the differential $TES_{max}$. At step S104, the track pitch detector 172 compares the obtained differential TES value with the minimum level (differential $TES_{min}$) up to the preceding sampling. When at step S105, the differential TES value is smaller than the differential $TES_{min}$, the track pitch detector 172 stores the differential TES value as the differential $TES_{min}$. Steps S101 to S105 are repeated for 100 ms, for example (step S106). Therefore, during the 100 ms period the maximum level and the minimum level of the differential TES values calculated by the differentiator 171 are obtained as the differential $TES_{max}$ and the differential $TES_{min}$.

When the 100 ms period of has passed at step S106, at step S107 the track pitch detector 172 calculates the sensitivity ratio of the obtained differential $TES_{max}$ to the obtained differential $TES_{min}$, i.e., sensitivity ratio
  = differential $TES_{min}$/differential $TES_{max}$
  (= groove sensitivity/land sensitivity).

If, at step S108, the obtained sensitivity ratio is greater than 0.6, at step S110 it is ascertained that the track pitch is 1.10

μm. If, at step S108, the sensitivity ratio is equal to or lower than 0.6, at step S109 a check is performed to determine whether the sensitivity ratio is greater than 0.5. When the sensitivity ratio is greater than 0.5, at step S111 it is ascertained that the track pitch is 1.39 μm. When the sensitivity ratio is equal to or smaller than 0.5, at step S112 it is ascertained that the track pitch is 1.60 μm. After the track pitch has been detected in this manner, the number of tracks up to a position near the center of a recording medium which corresponds to the track pitch is calculated. Further, in accordance with the detected track pitch, the type of recording medium, i.e., the differences in the memory capacities of the recording mediums, can also be identified. Since the memory capacities of recording media differ depending on the track pitch type, the type of recording medium can be identified in accordance with the memory capacity. In addition, since the sensitivity ratio of the lands to the grooves is compared, whether a recording medium is one for recording data only on the lands or one for recording data both on the lands and in the grooves can also be determined.

The TES amplitude and the offset adjustment processing will now be described. Generally, the sensitivities of individual recording media differ a little in accordance with errors occurring during the manufacturing of recording media, such as magneto-optical disks. Therefore, in accordance with a recording medium loaded into the apparatus, the level of the light returned by the recording medium is varied and the amplitude of the obtained TES is also changed. Furthermore, due to bending of the recording medium and distortion of the carriage 76, the position and the inclination of the light beam spot to the track will differ slightly depending on the position of the recording medium, and an offset may occur in the TES.

Since changes in the amplitude of the TES and the offset of the TES cause deterioration in the accuracy of the seek control and the on-track control, normally, an adjustment of the amplitude and the offset for the TES is required in the initial seek control process.

Figure 9:
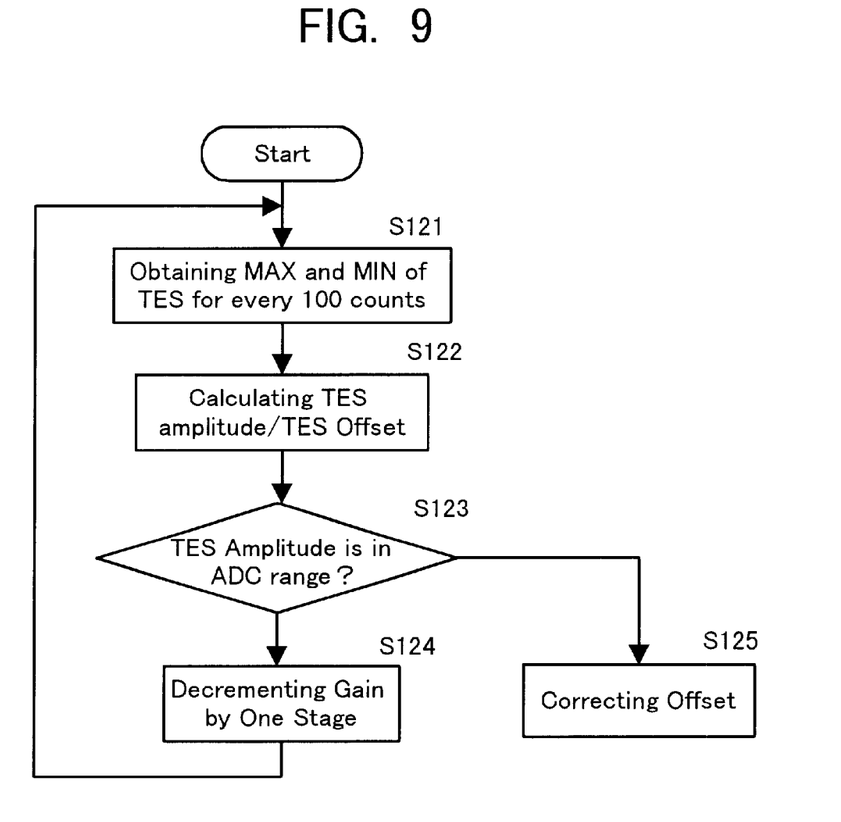
FIG. 9 is a flowchart showing the processing performed to adjust a TES amplitude and offset.

FIG. 9 is a flowchart showing the processing at step S12 for adjusting the amplitude and offset of a TES. At step S121, the amplitude measuring unit 161 holds the peak of the TES output by the ADC 160, and calculates the maximum level (MAX) and the minimum level (MIN) for the TES for every 100 tracks, for example.

At step S122, the TES amplitude and the TES offset are calculated by using the MAX and MIN of the TES as follows:

TES amplitude=MAX−MIN

TES offset=MAX+MIN.

While the center level in the range of the ADC 160 is defined as a zero level, a level smaller than zero (on the minimum level side) is defined as a negative level, and a level greater than zero (on the maximum level side) is defined as a positive level.

When, at step S123, the amplitude of the TES exceeds the range of the ADC 160, the maximum level (MAX) and the minimum level (MIN) of the TES can not be calculated, and the gain for the gain adjustment circuit 483, which adjusts the amplitude of the TES, is decremented by one stage to reduce it so that the amplitude of the TES is fitted to the ADC range. That is, the amplitude/offset calculator 130 transmits a control signal S1 to the gain adjustment circuit 483 and renders one of the switches of the circuit 483 non-conductive. The gain adjustment circuit 483 is initially set to the maximum gain at which all the amplifiers are placed in the conductive state. If the amplitude of the TES exceeds the ADC range, the gain is decremented by one stage, and steps S121 to S123 are repeated until the amplitude of the TES is in the ADC range. It should be noted that the TES amplitude is in the ADC range by the above described four-stage control, i.e., a maximum of three gain controls. The steps performed by the gain adjustment circuit 483 to adjust the TES amplitude are not limited to four, and may be more or less than four.

When the amplitude of the TES is in the ADC range, the amplitude/offset calculator 130 generates correction signals S2 and S3 to correct the obtained TES offset to zero, and supplies the correction signals S2 and S3 to the nodes 482 and 163.

As is described above, since the amplitude/offset adjustments for the TES are performed until the light beam spot is moved to near the center position, the on-track control can be performed at the same time as the number of tracks reaches a predetermined count and the light beam spot is positioned near the center. Conventionally, since various adjustments are performed after the light beam spot is positioned near the center, it takes a comparatively long time to be ready state which is prepared to receive a command from the host computer. However, according to the above described embodiment, the time required to reach the ready state can be reduced.

The inclination detection will now be described. In this embodiment, in order to maintain the constant speed, feed forward control based on the inclination of the carriage 76 is performed in addition to speed feedback control based on the difference between the detected speed of the carriage 76 and the target speed. Specifically, in the initial seek control process, when the carriage 76 is inclined downward, the strength of a track current required to move the carriage 76 at the target speed is less than that which is required when the carriage 76 is horizontal. When the carriage 76 is inclined upward, the strength of a track current required to move the carriage 76 at the target speed is greater than is that which is required when the carriage 76 is horizontal. Therefore, the inclination of the carriage 76 can be detected by integrating a track current for a predetermined period of time, and the carriage 76 can be accurately controlled at the constant speed by supplying a current in accordance with the integrated current.

More specifically, in FIG. 2 the speed controller 162 detects the speed of the carriage 76 by using the width of the TZC pulse and the track pitch detected by the track pitch detector 172, performs feedback control based on the difference between the detected speed and the target speed, and outputs a current having a predetermined strength to adjust the speed of the carriage 76 to the target speed. The current output by the speed controller 162 is transmitted via the switch 166 and is shaped by the gain control circuit 167, and the resultant current is supplied as a track current to the VCM 68. As is shown in FIG. 5, part of the current output by the speed controller 162 is integrated by an integrator 173 beginning at time W0, whereat the constant speed control is started. The integrating meter 173 integrates one part of the output current during a period, beginning at time W0, of 150 ms, for example. As is described above, since even though the target speed is the same the output current varies depending on the inclination of the carriage 76, a current corresponding to the inclination of the carriage 76 is calculated by integrating the output current for a predetermined period of time. The gain for the integrated current (see FIG. 5) is adjusted by a gain control circuit 174, and the resultant integrated current is added to the output current at a node 175. The change in the speed of the carriage 76 can be reduced by this feedback control, and a more accurate constant speed control can be attained with the constant speed control which is provided via the feedback control by the speed controller 162.

In the above embodiment, the present invention is applied for magneto-optical disks; however, the application of the present invention is not limited to magneto-optical disks, and can also be applied for recording mediums, such as a phase-change type recording medium.

As is described above, according to the present invention, when a recording medium is loaded or when power is turned on, the initial seek control process for moving the carriage from the innermost circumferential position of the recording medium or its vicinity to the center position can be performed without the position sensor.

Further, since the amplitude/offset adjustments for the TES are performed until a light beam is moved to a location near the center position, the apparatus can be set to the ready state for enabling the receipt of a command from the host computer, at the same time as the light beam spot is positioned on a target track.

The present invention may be embodied in other specific forms without departing from the spirit or essential characteristics thereof. The present embodiment is therefore to be considered in all respects as illustrative and not restrictive, the scope of the invention being indicated by the appended claims rather than by foregoing description and all change which come within the meaning and range of equivalency of the claims are therefore intended to be embraced therein.

What is claimed is:

1. An optical recording medium processing apparatus for accessing a recording medium by irradiating a light beam to the recording medium comprising:
    a carriage including a lens to guide said light beam to the recording medium for moving in a direction extending across tracks on the recording medium;
    a detector for detecting a tracking error signal indicating a difference between a predetermined track and a light beam spot on the recording medium; and
    a controller for moving said carriage across the tracks from an innermost circumferential position of the recording medium or the vicinity of the position, for counting the number of tracks in accordance with a track zero-cross pulse generated by a tracking error signal having a predetermined level or higher detected by said detector after said carriage has been moved for a predetermined period of time to obtain the tracking error signal from a track area including tracks standardized by a predetermined standard on the recording medium, and for positioning the light beam spot on a target track in accordance with the counted number of the tracks,
    wherein, during a medium initialization process, the controller moves said carriage for said predetermined period of time to pass a non-standardized area of the medium, and then starts counting the number of tracks from the beginning of a standardized area of the medium.

2. The optical recording medium processing apparatus according to claim 1, wherein said controller accelerates said carriage for a predetermined period of time, and then moves said carriage at a predetermined constant speed.

3. The optical recording medium processing apparatus according to claim 2, wherein said controller obtains the speed of said carriage based on a track pitch which is the width of one track and the period of said track zero-cross pulse, and moves said carriage at the predetermined constant speed based on the obtained speed.

4. The optical recording medium processing apparatus according to claim 3, wherein said controller obtains a sensitivity ratio of a land to a groove of the track by using the level of a differential signal of the tracking error signal, and detects said track pitch based on the sensitivity ratio.

5. The optical recording medium processing apparatus according to claim 4, wherein, until said track pitch is detected, said controller moves said carriage at a predetermined constant speed based on a predetermined track pitch which is set in advance.

6. The optical recording medium processing apparatus according to claim 2, wherein said controller adjusts the sensitivity of said tracking error signal during moving said carriage at the predetermined constant speed.

7. The optical recording medium processing apparatus according to claim 6, further comprising:
    a gain adjustment circuit for adjusting the gain for said tracking error signal under the control of said controller,
    wherein said gain adjustment circuit is initially set at the maximum gain.

8. The optical recording medium processing apparatus according to claim 2, wherein said controller corrects an offset of said tracking error signal during moving said carriage at the predetermined constant speed.

9. The optical recording medium processing apparatus according to claim 2, wherein said controller controls the strength of a current to move said carriage in accordance with the inclination of said carriage.

10. The optical recording medium processing apparatus according to claim 9, wherein said controller detects the inclination of said carriage by integrating the current to move said carriage during moving said carriage at the predetermined constant speed.

11. The optical recording medium processing apparatus according to claim 1, wherein focus control of said light beam is performed before said carriage is moved from the innermost circumferential position or the vicinity of the position.

12. The optical recording medium processing apparatus according to claim 1, wherein the target track is a track near the center position in a direction extending across the tracks on the recording medium.

13. An optical recording medium processing apparatus for accessing a recording medium by irradiating a light beam to the recording medium comprising:
    a carriage including a lens to guide said light bream to said recording medium for moving across tracks on the recording medium;
    a first detector for detecting a tracking error signal indicating a difference between a predetermined track and a light beam spot on the recording medium; and
    a second detector for obtaining a sensitivity ratio of a land to a groove of the track by using the level of a differential signal of the tracking error signal.

14. The optical recording medium processing apparatus according to claim 13, further comprising:
    a third detector for obtaining said track pitch based on the sensitivity ratio.

15. The optical recording medium processing apparatus according to claim 13, further comprising:
    a determiner for determining the number of the tracks from a first position to a second position in a direction extending across the tracks on the recording medium based on the detected track pitch.

16. The optical recording medium processing apparatus according to claim 15, further comprising:

a speed controller for moving said carriage at a predetermined constant speed based on the period of a track zero-cross pulse generated by using the tracking error signal.

17. A control method for positioning a light beam on a target track on a recording medium comprising the steps of:

moving a carriage including a lens to guide a light beam to the recording medium from an innermost circumferential position or the vicinity of the position of the recording medium to a direction extending across the tracks on the recording medium;

detecting a tracking error signal indicating a difference of a position between a predetermined track and a light beam spot on the recording medium after said carriage has been moved a predetermined period of time, to obtain the tracking error signal from a track area including tracks standardized by a predetermined standard on the recording medium;

counting the number of the tracks based on a track zero-cross pulse generated by using said tracking error signal having a predetermined level or higher; and positioning the light beam spot on a target track based on the counted number of the tracks, wherein, during a medium initialization process, said carriage initially moves for said predetermined period of time to pass a non-standardized area of the medium, and then starts counting the number of tracks from the beginning of a standardized area of the medium.

* * * * *